(12) United States Patent
Chumbley

(10) Patent No.: US 10,848,304 B2
(45) Date of Patent: *Nov. 24, 2020

(54) PUBLIC-PRIVATE KEY PAIR PROTECTED PASSWORD MANAGER

(71) Applicant: Visa International Service Association, San Francisco, CA (US)

(72) Inventor: Robert Chumbley, Round Rock, TX (US)

(73) Assignee: Visa International Service Association, San Francisco, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 16/038,011

(22) Filed: Jul. 17, 2018

(65) Prior Publication Data

US 2020/0028679 A1     Jan. 23, 2020

(51) Int. Cl.
*H04L 9/08* (2006.01)
*G06F 21/45* (2013.01)
*H04L 9/30* (2006.01)

(52) U.S. Cl.
CPC ............ *H04L 9/0894* (2013.01); *G06F 21/45* (2013.01); *H04L 9/088* (2013.01); *H04L 9/0863* (2013.01); *H04L 9/30* (2013.01)

(58) Field of Classification Search
CPC ..... H04L 9/0894; H04L 9/0863; H04L 9/088; H04L 9/30; G06F 21/45
See application file for complete search history.

(56) References Cited

U.S. PATENT DOCUMENTS

| | | | |
|---|---|---|---|
| 8,332,650 B2* | 12/2012 | Banes ..................... | G06F 21/31 713/182 |
| 8,447,990 B2* | 5/2013 | Utin ..................... | H04L 9/3226 713/183 |

(Continued)

FOREIGN PATENT DOCUMENTS

JP     2017028475     2/2017

OTHER PUBLICATIONS

PCT/US2019/035407 , "International Search Report and Written Opinion", dated Sep. 26, 2019, 12 pages.

(Continued)

*Primary Examiner* — Oleg Korsak
(74) *Attorney, Agent, or Firm* — Kilpatrick Townsend & Stockton LLP

(57) ABSTRACT

Embodiments of the invention provide methods and systems for password management using public-private key cryptography. A user device generates a public-private key pair including a public key and a private key and registers the public key with a remote password management server. Account names and passwords can be stored at the password management server in association with the public key. To retrieve the passwords, the user device sends a request to the password management server including the public key. The password management server determines the password from the stored passwords and encrypts it using the public key. The encrypted password is sent to the user device, which can decrypt the encrypted password using the private key corresponding to the public key. The user device can then use the account name and password can to obtain account information from an account provider.

21 Claims, 3 Drawing Sheets

(56) References Cited

U.S. PATENT DOCUMENTS

| | | | |
|---|---|---|---|
| 9,055,055 B1 | 6/2015 | Strand et al. | |
| 9,489,510 B1 * | 11/2016 | Scott | G06F 9/45533 |
| 9,727,715 B2 * | 8/2017 | Boodaei | H04L 9/0825 |
| 10,136,315 B2 | 11/2018 | Gong et al. | |
| 10,231,128 B1 * | 3/2019 | Ziraknejad | H04L 63/0428 |
| 10,666,642 B2 * | 5/2020 | Antonyraj | H04L 9/3226 |
| 2006/0156396 A1 | 7/2006 | Hochfield et al. | |
| 2007/0081667 A1 | 4/2007 | Hwang | |
| 2009/0198997 A1 | 8/2009 | Yeap et al. | |
| 2011/0078080 A1 | 3/2011 | Grube et al. | |
| 2012/0041882 A1 | 2/2012 | Vermeulen et al. | |
| 2014/0164254 A1 | 6/2014 | Dimmick | |
| 2015/0262170 A1 | 9/2015 | Bouda | |
| 2015/0281229 A1 | 10/2015 | Kang et al. | |
| 2016/0070894 A1 * | 3/2016 | Boodaei | H04L 63/045 |
| | | | 713/155 |
| 2016/0173277 A1 | 6/2016 | Sakumoto | |
| 2017/0126659 A1 | 5/2017 | Nichols et al. | |
| 2017/0187697 A1 | 6/2017 | Li et al. | |
| 2018/0047023 A1 | 2/2018 | Bouda | |
| 2018/0183777 A1 | 6/2018 | Guillory et al. | |
| 2019/0347435 A1 * | 11/2019 | Zheng | G06F 21/6209 |

OTHER PUBLICATIONS

U.S. Appl. No. 16/035,480; Non-Final Office Action dated Jun. 1, 2020; 34 pages.

\* cited by examiner

PUBLIC-PRIVATE KEY PAIR PROTECTED PASSWORD MANAGER

BACKGROUND

Many computer and web-based account providers use passwords to secure account logins. For example, passwords can be used to authenticate a person accessing an operating system login account, a website account, a software application, or a database. An account password, which is typically an alphanumeric string of characters, a gesture, an image, or a drawing, is often set by the user of the account when registering with an account provider. The account provider stores the user's password and associates it with an account name so that the user can authenticate with the password to login to their account.

While password-based authentication is commonplace, it suffers from many security concerns. Depending on the level of password complexity, a user's password may be determined or guessed using a dictionary or brute force attack. Passwords can also be determined by key-logging software or malware running on the user's device. In addition, a user may be deceived through phishing or social engineering to reveal their password. Also, the user's password may be obtained if an account provider's server storing that password is compromised. Accordingly, there is a need for improved systems and methods for account login authentication.

Embodiments of the invention address these and other problems individually and collectively.

SUMMARY

Embodiments of the invention provide improved systems and methods for password management.

One embodiment is directed to a method for password management performed by a user device. The method includes sending a request message to a password management server. The request message includes a public key of the user device, where the public key and a private key forming a public-private key pair. The public-private key pair may have been generated by the user device. The method further includes receiving a response message from the password management server. The response message includes an encrypted password. The method further includes decrypting the encrypted password using the private key to obtain a decrypted password. The method further includes obtaining access to account information using the decrypted password.

Another embodiment is directed to a method for password management performed by a password management server. The method includes receiving a request message from a user device. The request message includes a public key of the user device. The method further includes determining a stored password associated with the public key. The password may be stored in association with the public key in a password database. The method further includes encrypting the stored password using the public key to obtain an encrypted password. The method further includes sending a response message to the user device, the response message including encrypted password.

Another embodiments is directed to a user device. The user device can perform password management functions. The user device includes one or more processor circuits, a communication interface, and a computer readable storage medium. The computer readable storage medium stores a plurality of instructions that, when executed by the one or more processor circuits, cause the one or more processor circuits to perform password management functions. For instance, the instructions cause the user device to send, using the communication interface, a request message to a password management server. The request message includes a public key of the user device, where the public key and a private key forming a public-private key pair. The user device receives, using the communication interface, a response message from the password management server. The response message including an encrypted password. The user device decrypts the encrypted password using the private key to obtain a decrypted password. The user device then obtains access to account information using the decrypted password.

Further details can be found in the detailed description and the figures.

DETAILED DESCRIPTION

Figure 1:
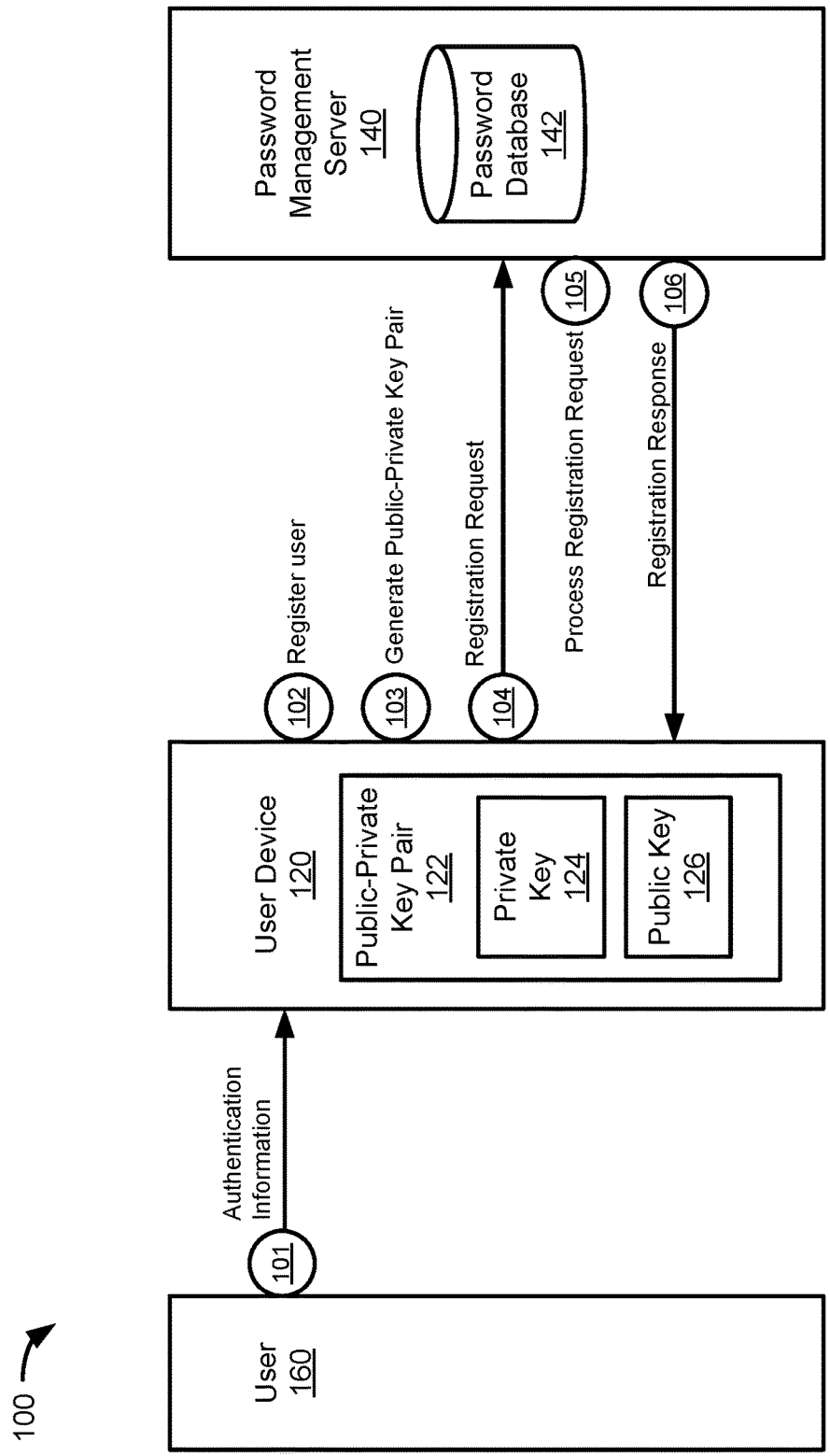
FIG. 1 shows an information flow diagram of a user device registering with a password management server, in accordance with some embodiments.

Passwords are often used to login to accounts maintained by websites and software applications. Account users may be able to set a password and an account name (e.g., user name) during a registration process with the account provider. Users typically select memorable passwords so that they do not forget them. However, such passwords are often more susceptible to being discovered using password security attacks (e.g., dictionary attacks or brute force attacks). More complex passwords have less risk of being discovered through such attacks. However, more complex passwords may be difficult for users to remember.

Password management software may be used to ensure that a user does not forget their passwords. Password management software can store pairs of account names and associated passwords that can be retrieved when a user needs to login to a website. Password management software may store passwords locally on a user's computing device or remotely on a server. To retrieve a password to use for logging into a website, the user can select the appropriate account name and/or password to be retrieved from a list provided the password manager. In some cases, the password management software running on the user device or the password management server may automatically determine the appropriate account name and/or password using the domain or another identifier of the account provider (e.g., website).

In order to secure the stored passwords, password management software may use a master password to authenticate the user. Use of a master password also enables the user to access their remotely stored passwords across multiple user devices. Thus, password management software has the advantage in that the user only needs to remember single password (e.g., the master password). This enables the user to establish complex passwords with various accounts providers, instead of using memorable but less complex passwords, thereby improving password security.

While password security is improved by using more complex passwords, the user's master password may not be secure itself. For instance, the master password for the password management software may be compromised by key-logging software or other malware running on the user's computing device. In addition, the user may be deceived to reveal their master password through phishing (e.g., fraudulent communications that appear to be legitimate) or social engineering techniques (e.g., communications that manipulate people into revealing confidential information). Computer implemented security may not protect a password if the user is tricked into revealing it. If the master password is compromised, a different user that is not the owner of the password management account may use the master password to access the passwords stored at the password management server, thereby compromising each associated account. Thus, the use of master passwords to authenticate with password management software suffers from many security vulnerabilities. There is a need for improved password management systems that are resistant or immune to such security compromises.

Embodiments of the invention described below provide improved password management systems and methods using public-private key cryptography instead of master passwords. During a password management account registration process, the user device can generate a public-private key pair including a public key and a private key. Instead of establishing a master password for authentication with a password management server, the user device can send the public key to be registered instead. The user device can also create a password management account name that is sent to the password management server and associated with their public key.

To retrieve the passwords during an account login process, the user device sends the public key to the password management server, which can look up pairs of accounts and passwords associated with that public key and/or the user's password management account name. The management server provides a list of the accounts and/or passwords back to the user device. The list of accounts may comprise identifiers of the accounts and identifiers of the account provider that provides that account. The user of the user device can select the password to be retrieved (e.g., by selecting an account identifier in the list). The user device then sends a password retrieval request message to the password management server including the selected account name. In some embodiments, the account name and/or password can be selected automatically by the password management server using an identifier of the website. For example, password management software running as a plug-in to a web browser may be able to access the URL of the currently displayed website and can use this URL to determine an account provider identifier of the account provider operating the website.

The password management server determines the stored password associated with the account name and encrypts the associated password using the registered public key of the user device. Thus, only the registered user device may be able to decrypt the password since the corresponding private key is require to decrypt the encrypted password and only the registered user device may have access to the private key. For example, the user device may not share or reveal the private key to any user or other computing device and it may not transmit the private key over a network. In addition, the private key may be stored in a secure hardware environment.

The password management server sends the encrypted password to the user device, which decrypts the password using the private key corresponding to the public key. Then, the user device can login to the account or website using that password. In some embodiments, where the password management server determines the user's account name from an identifier of the account provider, the password management server can send the account name to the user device to use for logging, along with the password. As such, the user can retrieve their stored passwords using public-private key cryptography instead of using a master password. Since a public-private key pair is used instead of a master password, only the registered user device may be capable of decrypting the encrypted passwords received from the password management server Furthermore, the password management software may enable the user may to automatically login to an account or website without inputting any passwords.

Thus, use of public-private key cryptography to access password management systems provides security improvements over master password-based password management systems. Prior to discussing specific embodiments of the invention, some terms may be described in detail.

I. Terms

A "user" can be a person or thing that employs some other thing for some purpose. A user may include an individual that may be associated with one or more personal accounts and/or mobile devices. The user may also be referred to as a cardholder, account holder, or consumer in some embodiments.

A "user device" may comprise any suitable computing device that can be used for communication. A user device may also be referred to as a "communication device" or a "computing device." A user device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of user devices include desktop computers, videogame consoles, mobile phones (e.g., cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote or direct communication capabilities. A user device may comprise any suitable hardware and software for performing such functions, and may also include multiple devices or components (e.g., when a device has remote access to a network by tethering to another device—i.e., using the other device as a modem—both devices taken together may be considered a single communication device). For example, a user device may comprise password management software for managing passwords by communicating with a password management server. Description herein of steps, operations, or functions performed by the user device may be performed in the password management software installed on the user device.

The term "server computer" may include any suitable computing device that can provide communications to other computing devices and receive communications from other computing devices. For instance, a server computer can be a mainframe, a minicomputer cluster, or a group of servers functioning as a unit. In one example, a server computer may be a database server. A server computer may be include a database or be coupled to a database and may include any hardware, software, other logic, or combination of the preceding for servicing the requests from one or more client computers. For example, the server computer can include and operate a relational database. A server computer may comprise one or more computational apparatuses and may use any of a variety of computing structures, arrangements, and compilations for servicing the requests from one or more client computers. Data transfer and other communications between components such as computers may occur via any suitable wired or wireless network, such as the Internet or private networks.

An "account provider" can include an entity that provide accounts for use by users and/or user devices. Examples of the types of accounts that can be provided by account providers include e-mail accounts, digital storage accounts, social media accounts, merchant or e-commerce website accounts, etc. An account provider may provide an "authentication server" to maintain and store account information and authentication information (e.g., public keys, passwords, or password hashes) for each user account. In some embodiments, the authentication server may store the authentication information used during registration and login processes while a separate server stores the account information to be provided after a user device is authenticated.

The term "public/private key pair" may include a pair of linked cryptographic keys generated by an entity (e.g., a computer or an electronic device). The public key may be used for public functions such as encrypting a message to send to the entity or for verifying a digital signature which was supposedly made by the entity. The private key, on the other hand, may be used for private functions such as decrypting a received message or applying a digital signature. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on RSA Rivest-Shamir-Adleman (RSA) cryptography or elliptic curve cryptography (ECC).

An "encryption key" may include any data value or other information suitable to cryptographically encrypt data. A "decryption key" may include any data value or other information suitable to decrypt encrypted data. In some cases, the same key used to encrypt data may be operable to decrypt the data. Such a key may be known as a symmetric encryption key. Encryption and decryption keys may be examples of cryptographic keys.

The term "authentication" generally refers to a process of establishing confidence in the identity of a user or a computer. Authentication may be performed using passwords, pass codes, images, or gestures. Authentication may also be performed by confirming the identity of a device using public key cryptography (e.g., encrypted data or digital signatures) for authentication information. Authentication may also be performed using biometric data. The term "authentication data" or "authentication information" may include any data or information suitable to authenticate a user or device. Examples of authentication data may include a password or passphrase, decrypted challenge, a public key corresponding to a registered public key, a secret key (e.g., a private key), a digital signature, an indication that the device is storing certain information, etc. An "authentication server" that receives authentication information (e.g., a password, a public key, a decrypted challenge) and conduct an authentication process using that information.

An "Application Programming Interface" (API) is a set of procedures, protocols, or tools for building software applications. An API may be used to build applications which allow communication between one or more entities. Examples of APIs include POSIX, and the C++ Standard Template Library. An "API call" is a communication between two software applications or computers made possible by an API. An API call could include a standardized method of requesting or delivering information between software applications, such as a client-side application and a server-side application according to the server-side API. An API call could take the form of an HTTP method, such as GET, POST, PUT, or DE. For example, account registration, password management, and account login messages described here can be formatted and transmitted according to different APIs.

A "processor" or "processor circuit" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron, etc.; IBM and/or Motorola's PowerPC; IBM's and Sony's Cell processor; Intel's Celeron, Itanium, Pentium, Xeon, and/or Xscale, etc.; and/or the like processor(s).

A "memory" or "system memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

While not necessarily described, messages communicated between any of the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. For example, messages sent between the user device and the password management server may be sent secure communication protocols such as those listed above.

II. Password Management Registration Using Public-Private Key Cryptography

Embodiments of the invention provide improved systems and methods for managing passwords using public-private key cryptography instead of master passwords. Password management software installed on a user's device can register with a password management server by generating a public-private key pair including a public key and a private key, and sending the public key to the password management server. The password management server can then associate the user's stored passwords with this public key and use the registered public key to encrypt the passwords during password retrieval. Thus, instead of establishing a master password during registration, the user device registers their generated public key with the password management server.

Figure 2:
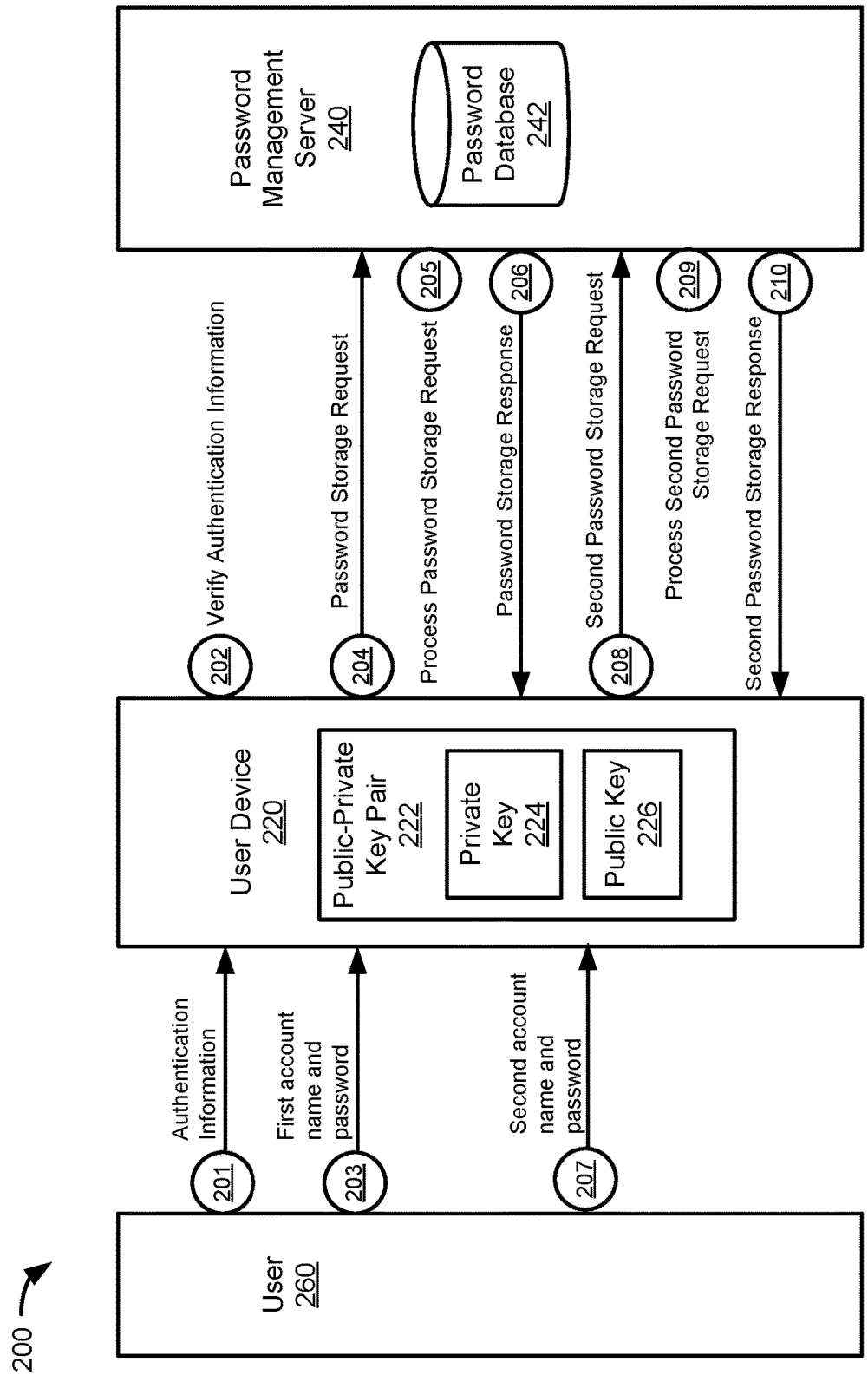
FIG. 2 shows an information flow diagram of a user device storing passwords at a password management server, in accordance with some embodiments.
Figure 3:
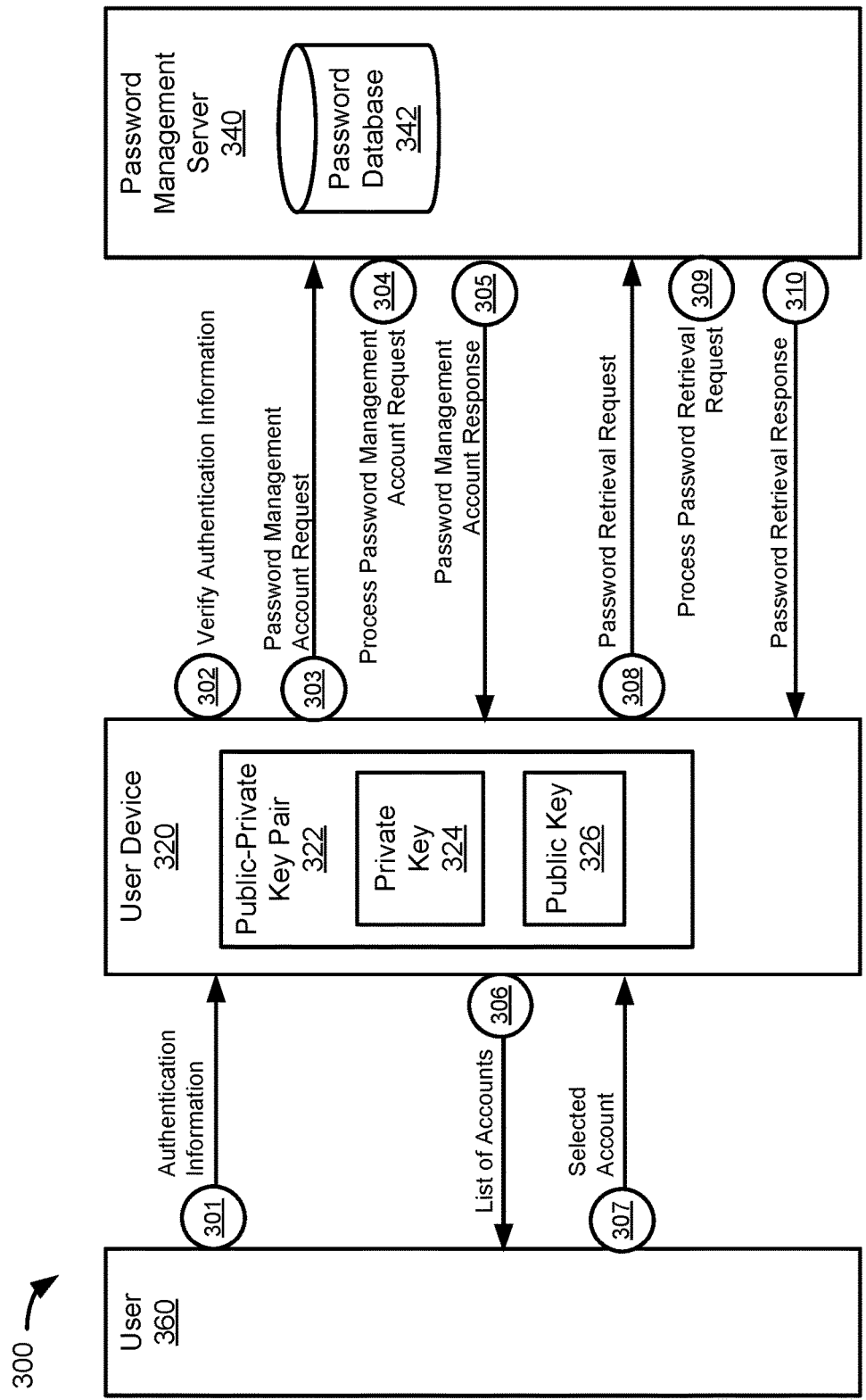
FIG. 3 shows an information flow diagram of a user device retrieving passwords from a password management server, in accordance with some embodiments.

FIGS. 1-3 show information flow diagrams for a registration process, a password storage process, and a password retrieval process, respectively. These processes are conducted between a user device and a password management server. In such embodiments, passwords are stored remotely at the password management server and are retrieved over a communication networks. However, some embodiments may not use a password management server and the password management software may instead store and retrieve the passwords locally. Thus, similar steps and processes described below with respect to FIGS. 1-3 may be used in local-storage embodiments, except steps for the user device sending and receiving messages from the password management server can be absent since the operations are performed locally.

FIG. 1 shows an information flow diagram 100 of a user device 120 registering with a password management server 140, in accordance with some embodiments. Steps of the information flow diagram 100 of FIG. 1 may be removed or performed in a different sequence unless doing so would prevent the other steps for completing successfully. While a user 160 is shown as performing steps in FIG. 1, the steps performed by the user 160 are optional and may not be included or similar operations may be performed by the user device 120 instead.

The information flow diagram 100 of FIG. 1 shows messages communicated between a user device 120 and a password management server 140. The user device 120 may be a mobile computing device (e.g., a mobile phone or tablet) or a personal computer (e.g., a desktop or notebook computer). The user device 120 is operated by a user 160. The user may provide input to the user device using a user interface of the user device. The user interface can be displayed on a monitor or display screen of the user device 120 and can be operated using input devices, such as a keyboard and mouse pointer or a touchscreen element of the display.

Prior to the information flow shown in FIG. 1, the user 160 of the user device 120 can install a password management application on the user device 120. In some cases, the password management software may be pre-installed or included in the operating system of the user device 120 or included with a web browser installed on the user device 120. The password management application can be a stand-alone software application or it may be a plug-in to a web browser. The password management application is configured to initiate password storage and retrieval requests to the password management server 140. In some embodiments, the user 160 can establish a password or other authentication data (e.g., biometric data) for authenticating with the password management application on the user device. While passwords suffer from the security flaws discussed here, this password may be secure because it is input locally on the user device 120 and is not transmitted over a communication network. Thus, the password for the password management application cannot be used to access the password manager without physical access to the user device 120.

At step 101, the user 160 can provide input to the user device 120 to establish the authentication information used to login to the password management application installed on the user device 120. In some embodiments, the password management application can support multiple users or accounts and the user 160 can establish a password management account name. The user device 120 may prompt the user 160 to provide such information using a user interface. The user device 120 may determine the password management account name based on input from the user interface of the user device. Thus, the user device can obtain authentication of the user 160 of the user device 120.

Step 101 is optional and may not be included in some embodiments. That is, the user 160 may not establish a password or other authentication data with the password management software. Instead, the user 160 may be authenticated by other authentication software installed on the user device 120 (e.g., by an operating system account manager). In some cases, the user is not authenticated and the user device 120 is secured by other means (e.g., physical security).

At step 102, the user device 120 registers the user 160. Registration of the user 160 may include storing the authentication information of the user 160. Registration of the user 160 may include storing the password management account name, when one is provided. In some embodiments, the user device 120 may generate the password management account name or it may be provided by the password management server 140. Registration may also include associating the authentication information with the password management account name.

After registering the user 160, the user device 120 generates a public-private key pair 122 at step 103. The public-private key pair 122 includes a public key 126 and a private key 124. In some embodiments, the password management server 140 can generate the public-private key pair 122, instead of the user device, and the password management server 140 can send the public-private key pair 122 to the user device over a secure communication channel. In some embodiments, the user device 120 may generate the public-private key pair 122 in response to input to a user interface on the user device. The public-private key pair 322 may be generated according to RSA cryptography or elliptic curve cryptography, for example. For example, the user device 120 may generate the public-private key pair 122 in response to a button press confirming an account name entered by the user 160 during registration.

After generating the public-private key pair 122, the user device 120 stores the private key 124 and the public key 126. The private key 124 may be stored in a secure hardware storage environment. Then, the user device 120 creates a registration request message including the public key 126. At step 104, the user device sends the registration request message to the password management server 140. In some embodiments, the creating of the registration request message can be based on input from the user interface (e.g., from the user). For instance, the registration request message can include the password management account name. The registration request message can be sent over a communication network (e.g., the Internet) using a network communication interface of the user device (e.g., Ethernet or Wi-Fi).

The password manager server 140 receives the registration request message. At step 105, the password manager server 140 processes the registration request message. In processing the registration request message, the password manager server 140 can determine whether the public key included in the registration request message has been registered or not. To do this, the password manager server 140 determines whether the public key matches one of a plurality of registered public keys stored at the password manager server 140. If the public key received in the registration request message does not match a previously registered public key, then the password manager server 140 can register that public key. If the received public key matches a previously registered public key then the password manager server 140 may deny the registration request. For example, the user device 120 may have been compromised or is bugged.

If registration is granted, the password manager server 140 can store the public key received from the user device 120 in the registration request message. In some embodiments, the user device can include a password management account name in the registration request message. In such embodiments, the password manager server 140 can associate the password management account name with the public key. For example, the password manager server 140 can associate the password management account name with the public key in a password database 142. The password database 12 may also be used to store passwords associated with the public key and/or the password management account name as discussed herein.

At 106, the password manager server 140 can send a registration response message to the user device 120. The registration response message includes an indication of whether or not the public key is registered. The registration response message can also indicate whether the password management account name provided by the user device 120 was registered.

Thus, the password management application running on the user device 120 can register with the password management server 140 using the public key 126, instead of using a master password. Furthermore, while authentication data (e.g., passwords or biometric data) may be used to authenticate the user 160 with the password management application, use of this authentication data would require physical access to the user device 120 and would not enable an attack to gain access to the passwords storage at the password management server 140 if it were compromised.

In some embodiments, the password management server can enable a user to "bootstrap" a second user device to the first user device such that the second user device can access the passwords stored by the first user device. In addition, the first user device may be able to access passwords stored by the second user device. This bootstrapping process can be performed during a registration process with the second user device, which can be similar to the registration process above. To do this, a password management account name may be associated with the first public key of the first user device. Then, if the bootstrapping process is successful, the second public key of the second user device can be associated with the same password management account name, as discussed below.

To bootstrap the second user device, the password management server first receives a second registration request message from the second user device. The second registration request message includes the password management account name (e.g., the same account name registered with the public key of the first user device) and the second public key of the second user device. The second registration request message may include an indication that the password management account name is already registered and that this registration request is a bootstrap registration request. Then, the password management server can determine whether the password management account name included in the second registration request message is already associated one of the stored public keys (e.g., the first public key of the first user device).

If the password management account name is already associated with the first user device, the password management server can send a verification request message to the first user device. The verification request message can include an identifier or indicator of the second user device. This identifier or indicator can be provided by the second user device in the second registration request message or it can be determined by the password management server. The verification process enables the user of the first user device to verify that the second user device is allowed access to the passwords that it stored. The verification request message can be sent to the first user device (e.g., via the password management software) or it can be sent via an email, SMS text message, or any other suitable means.

If the user wants to grant the second device access to their passwords, they can accept using a button on a user interface or by sending a text response in a verification response message. The verification response message includes an indication that the second user device is authorized to access passwords associated with the password management account name. If the second user device is not authorized, then the password management server may not register the second user device and may not grant the second user device access to the passwords stored by the first user device. If the second user device is granted access, then the password management server associates the second public key with the password management account name and each stored password associated with the first public key. The password management server can also send a second registration response message to the second user device. The second registration response message includes a second indication that the second public key is registered. This registration response message may also be sent to the first user device if the first user device was used to verify the second user device. Thus, the second user device and the first user device can share the passwords stored by either device. This is advantageous because the user can easily access their stored passwords across multiple devices that they use.

III. Remote Password Storage Using Public-Private Key Cryptography

After registering with the password management server, the user device can remotely store passwords at the password management server. The user device can establish a secure communication channel with the password management server and use the secure communication channel to send the passwords to the password management server. The password management server can store the passwords in a password database. The passwords can be stored in association with the user device's public key and/or a password management account name.

FIG. 2 shows an information flow diagram 200 of a user device 220 storing passwords at a password management server 240, in accordance with some embodiments. The user 260, user device 220, and password management server 240 of FIG. 2 may be configured and may operate similar to those same elements as described above with respect to FIG. 1. Steps of the information flow diagram 200 of FIG. 2 may be removed or performed in a different sequence unless doing so would prevent the other steps for completing successfully. While a user 260 is shown as performing steps in FIG. 2, the steps performed by the user 260 are optional and may not be included or similar operations may be performed by the user device 220 instead.

Prior to the steps performed in the information flow diagram 200 of FIG. 2, the user device 220 may have previously registered with the password management server 240 as discussed above with respect to FIG. 1. For instance, the user device 220 may have sent a public key 226 to the password management server 240 during the registration process. As such, the password management server 240 may store the public key 226 in the password database 242.

In some embodiments, the user device 220 may prompt the user 260 to provide authentication information via a user interface the user device 220. For example, the user device 320 may display a message or an input field. Then the user device 220 can obtain the authentication information from the user. For example, the user device 220 can obtain a password input by the user 260 (e.g., from a text-entry field or by scanning a fingerprint using fingerprint scanner hardware and software). At step 201, the user 260 can provide authentication information to the user device 220. As described above, the authentication information may be a password or it may be biometric data (e.g., a fingerprint, face scan, or retina scan).

The authentication information provided by the user 260 at step 201 may match the authentication information provided by the user 160 at step 101 of the registration process described above with respect to FIG. 1. To verify the authentication information, at step 202 the user device 220 can compare the authentication information provided by the user 260 at step 201 to the registered authentication information obtained during the registration process (e.g., at step 101 of FIG. 1). The authentication information is validated if the provided authentication information matches the registered authentication information. If the authentication information is validated, then the user 260 is granted access to the password management software. If the authentication information is not validated, then the user is denied access to the password management software. The steps for authenticating the user 260 are optional and may not be included in some embodiments.

Once the user 260 has access to the password management software they can store pairs of account names and passwords together. The user device 220 can prompt the user 260, via a user interface, to input a new account name and corresponding password. The user device can provide text-entry fields for the user 260 to input the account name and password. At 203, the user can provide the account name and password to the user device 220 (e.g., via the text-entry fields and the user interface). In some embodiments, the user may also input an account identifier or an account provider identifier as an indication to the user of which account and which account provider the password is associated with.

In some embodiments, the user 260 does not input the password. Instead, the user device 220 may randomly, or pseudo-randomly, generate a complex password for each new account registered by the user. A complex password may include, for example, alpha-numeric characters (e.g., a, b, c, 1, 2, 3), non-alphanumeric special characters (e.g., !, @, #, $, %), and both upper and lowercase letters. Complex passwords may also include a large number of characters (e.g., the maximum, or close to the maximum, number of characters allowable by a particular authentication server). Complex passwords are complex in that they cannot be easily determining using brute force or dictionary style password attacks due to their long length in characters and their use of non-alphanumeric characters and capital letters. In addition, the user device 220 may randomly, or pseudo-randomly, generate an account name for the new account registered by the user. If the account name and password are provided by the user 260, the user 260 may have already registered the account name and password with the account provider. If the user device 220 generates the account name and password, the user device 220 can input this information during a registration process with an authentication server of the account provider. In some cases, the account name may be referred to as a user name instead.

After obtaining the account name and the password (e.g., from the user 260 or by generating them), the user device 220 sends a password storage request to the password management server, at step 204. The password storage request includes the public key, the password, and the account name. In some embodiments, the user device 220 can also include an account manager identifier or account identifier in the password storage request. The account manager identifier and account identifier may be determined by the user device 220 or it may be set by the user 260. For example, the user device 220 may determine an account manager identifier based on a URL of a website provided by the account manager.

The user device 220 can send the password storage request to the password management server 240 over a communication network (e.g., the Internet). In order to secure the password, the user device 220 can establish a secure communication channel with the password management server. The password storage request can be sent to the password management server using the secure communication channel. The secure channel can use any appropriate secure communication protocol (e.g., HTTPS or SSL). In some embodiments, the password management server 240 may implement further security protocols to ensure that different user devices are cannot fraudulently or accidentally submit password storage requests for other user devices.

The password management server 240 receives the password storage request from the user device 220 (e.g., over the communication network). As discussed above, the password storage request includes the public key, the password, and a first account name. The password storage request can also include the account identifier and/or the account provider identifier. After receiving the password storage request, the password management server 240 can process the password storage request, at step 205. Processing the password storage request can include checking to see whether the account name is already associated (e.g., registered) with the user's password management account name at the password management server 240.

Processing the password storage request can also include checking to see whether the account identifier and/or account provider identifiers are already associated with the user's password management account. If the account identifier and/or account manager identifiers are not in use, the password manager may store the password in association with the account name. Thus, the processing of the password storage request can further include storing the first password in association with the first account name and the public key. The password and associated account name can be stored in the password database 242. The password management server 240 can also associate the public key 226 of the user device with the password and account name in the password database 242.

After storing the password and associated account name, the password management server can send a password storage response message to the user device 220, at step 206. The password storage response message includes an indication of whether the first password has been stored. For example, the password storage response message can include an indication that the password is stored in association with the account name and the public key. In some embodiments, the password storage response message can also indicate the account identifier and/or the account provider identifier associated with the account name. The password manager server 240 may send the password storage response message over the communication network. The user device receives the password storage response message from the password management server 240. In some embodiments, the user device 220 can display (e.g., to the user 260 via the user interface) at least a portion of the information received in the password storage response message.

The user device 220 can store a plurality of pairs of account names and passwords at the password management server 240. This way the user can log into a plurality of different accounts (e.g., accounts provided by account providers) using the password management software. Steps 207, 208, 209, and 210 of FIG. 2 show the user device 220 obtaining a second account name and password, sending a second password storage request message to the password management server 240, and the password management server 240 sending a second password storage response to the user device 220. Steps 207-210 are similar to steps 203-206 of FIG. 2 except for a second (new) account name and password pair. These steps can be repeated for any number of account/password pairs.

Thus, the password management server 240 can store a plurality of account name and password pairs for the user device 220 such that the user can login to numerous different account (e.g., provided by an account provider) using the password manager application on the user device 220. Retrieval of these passwords and account name is described below with respect to FIG. 3.

IV. Remote Password Retrieval Using Public-Private Key Cryptography

After the passwords have been stored at the password management server, they can be retrieved. To retrieve the passwords during an account login process, the user device send the public key to the password management server, which can look up pairs of accounts and passwords associated with that public key, and provide the password to the user device.

FIG. 3 shows an information flow diagram of a user device retrieving passwords from a password management server, in accordance with some embodiments. The user 360, user device 320, and password management server 340 of FIG. 2 may be configured and may operate similar to those same elements as described above with respect to FIGS. 1 and 2. Steps of the information flow diagram 300 of FIG. 3 may be removed or performed in a different sequence unless doing so would prevent the other steps for completing successfully. While a user 360 is shown as performing steps in FIG. 3, the steps performed by the user 360 are optional and may not be included or similar operations may be performed by the user device 320 instead.

Prior to the steps performed in the information flow diagram 300 of FIG. 3, the user device 320 may have previously registered with the password management server 340 as discussed above with respect to FIG. 1. For instance, the user device 320 may have sent a public key 326 to the password management server 340 during the registration process. As such, the password management server 340 may store the public key 326 in the password database 342. In addition, the user device 320 may have previously stored passwords and account names at the password management server as discussed above with respect to FIG. 2. For instance, the user device 320 may have sent a password storage request message to the password management server 340 including an account name and a password, and the password management server may have stored the account name and password, associated with each other, in the password database.

In some embodiments, the user device 320 may prompt the user 360 to provide authentication information via a user interface the user device 320. For example, the user device 320 may display a message or an input field. Then the user device 320 can obtain the authentication information from the user. For example, the user device 320 can obtain a password input by the user 360 (e.g., from a text-entry field or by scanning a fingerprint using fingerprint scanner hardware and software). At step 301, the user 360 can provide authentication information to the user device 320. As described above, the authentication information may be a password or it may be biometric data (e.g., a fingerprint, face scan, or retina scan).

The authentication information provided by the user 360 at step 301 may match the authentication information provided by the user 160 at step 101 of the registration process described above with respect to FIG. 1. To verify the authentication information, at step 302 the user device 320 can compare the authentication information provided by the user 360 at step 301 to the registered authentication information obtained during the registration process (e.g., at step 101 of FIG. 1). The authentication information is validated if the provided authentication information matches the registered authentication information. If the authentication information is validated, then the user 360 is granted access to the password management software. If the authentication information is not validated, then the user is denied access to the password management software. The steps for authenticating the user 360 are optional and may not be included in some embodiments.

Once the user 360 has access to the password management software they can retrieve passwords and/or associated account names form the password management server 340. At 304, the user device 320 sends a password management account request message to the password management server. The request message including the public key 326 of the user device. As discussed above, the public key 326 and the private key 324 form the public-private key pair 322. The password management account request may include the user's password management account name that was previously registered. The user device 320 can send the password management account request to the password management server 340 over the communication network.

The password management server 340 receives the password management request message from the user device 320 and, at step 304, processing the password management account request. The processing of the password management account request can include determining one or more account names associated with the public key from the password database. As discussed above, the account names and passwords may be provided by the user device 220 in a password storage request message. Then, at step 305, the password management server 340 can send (e.g., over the communication network) a password management response message including the one or more account names to the user device.

The user device 320 receives the password management account response, including the one or more account names associated with the public key, from the password management server. The one or more account names can be used by the user device to select which password to retrieve. To do this, the user device 320 can display, at step 306, the one or more account names on a user interface of the user device (e.g., on a display screen). At step 307, the user 360 can use the user interface and an input device (e.g., pointer or touch screen) to make a selection of one of the accounts from the one or more account names listed. The user device 320 can determine the selected account name based on input to the user interface (e.g., by use of the input device by the user 360). Then, the user device 320 can send, at step 308, a password retrieval request to the password management server. The password retrieval request including the selected account name.

The password management server 340 receives the password retrieval request from the user device 320. As discussed above, the password retrieval request includes the selected account name. Then the password management server 340 can process the password retrieval request, at step 309. Processing the password retrieval request can include determining that the selected account name is associated with the public key. In some embodiments, the password retrieval request includes determining that the selected account name is associated with the password management account name (which is associated with the public key). The public key will be used to encrypt the password so that only the user device 320 can decrypt the password.

As part of processing the password retrieval request, the password management server 340 looks up the associated password using the password database 342. The password management server 340 determines a stored password associated with the selected account name and the public key. Then, the password management server 340 encrypts the retrieved password using the associated (e.g., registered) public key 326 that is stored in the password database 342.

In some embodiments, the password management server 340 automatically determines the account name instead of determine and providing a list of accounts to the user 360 (e.g., at least portions of steps 304-306) and receiving their selection of a particular account (e.g., at least portions of steps 307-309). To do this, an identifier of the account name and/or an identifier of the account provider may be included in the password management account request sent by the user device 320 at step 303. The account identifier and/or the account provider identifier may have been previously associated with a particular account name and password stored in the password database 342. For example, an identifier of the account provider can be a website domain of a URL of a website hosted by the account provider. After encrypting the password, the password management server 340 sends a password retrieval response message to the user device 320, at step 310. The password retrieval response message includes encrypted password.

The user device 320 receives the password retrieval response message from the password management server 340, including an encrypted password. Then the user device 320 decrypts the encrypted password using the private key 324. As discussed herein, only the user device 320 has access to the private key 324 (e.g., because the private key 324 is not shared, or transmitted, and it is stored in a secure environment). Thus, the encrypted password included in the password retrieval response may only be decrypted by the user device 320. The user device 320 can then obtain access to account information using the decrypted password. The account information may be provided by an account provider via a website. The user device 320 may automatically submit the decrypted password and the associated account name to an authentication server for a particular website to obtain access to user's the account information, which can be displayed on the user interface.

Thus, the user can use password management software to retrieve remotely stored passwords using public-key cryptography, without the use of a master password for authenticating with the password management server. Use of public-private key cryptography is advantageous because, as discussed above, only the user device that registered its public key with the password management server can obtain access to the passwords associated with that public key. This is because the password management server 340 encrypts the passwords using the public key and only the registered user device 320 has access to the private key 324 needed to decrypt the encrypted passwords.

V. Exemplary Methods

An exemplary method for password management performed by a user device can include steps for password retrieval. The method can include sending, by a user device, a request message to a password management server. The request message includes a public key of the user device. The public key and a private key forming a public-private key pair. The method may include generating the public-private key pair prior to sending the request message. In some embodiments, the method can further include associating the public-private key pair with authentication information provided by a user of the user device. The method further includes receiving a response message from the password management server. The response message includes an encrypted password. The authentication management server may have determined a stored password associated with the public key and encrypt the stored password using the public key to obtain the encrypted password. The method further includes decrypting the encrypted password using the private key to obtain a decrypted password. Then, the method further includes obtaining access to account information using the decrypted password.

In some embodiments, the method for password management can further include receiving one or more account names associated with the public key from the password management server. The one or more account names include a first account name. Then the method can further include sending a password retrieval request including the first account name to the password management server. In some embodiments, the method can further include displaying the one or more account names on a user interface of the user device. The method can further include determining the first account name based on input to the user interface.

In some embodiments, the method for password management can further include steps for authenticating the user. For example, the method can further include prompting, via a user interface, a user to provide authentication information. The method can further include obtaining the authentication information from the user. The method can further include comparing the authentication information to registered authentication information. The method can further include validating the authentication information based on the comparing of the authentication information to the registered authentication information.

In some embodiments, the method for password management can further steps for registering with the password management server. For example, the method can further include sending a registration request message to the password management server. The registration request message including the public key. In addition, the method can further include receiving a registration response from the password management server. The registration response includes an indication that the public key is registered to the user device. The method can further include determining a password management account name based on input from a user interface of the user device. The method can further include creating the registration request message based on the input from the user interface. The registration request message can further includes the password management account name.

In some embodiments, the method for password management can further steps for storing passwords at the password management server. For example, the method can further include obtaining a first password associated with a first account name. The method can further include sending a password storage request to the password management server. The password storage request includes the public key, the first password, and the first account name. The method can further include receiving a password storage response message from the password management server. The password storage response message includes an indication that the first password is stored in association with the first account name and the public key. The method can further include establishing a secure communication channel with the password management server. The password storage request can be sent to the password management server using the secure communication channel.

An exemplary method for password management performed by a password management server can include steps for password retrieval. The method can include receiving a request message from a user device. The request message includes a public key. The method further includes determining a stored password associated with the public key. The method further includes encrypting the stored password using the public key to obtain an encrypted password. The method further include sending a response message to the user device, the response message including encrypted password.

In some embodiments, the method performed by the password management server includes determining one or more account names associated with the public key, the one or more account names including a first account name. The method can further include sending the one or more account names to the user device. The method can further include receiving a password retrieval request from the user device. The password retrieval request includes the first account name. The method can further include determining that the first account name is associated with the public key. The method can further include determining the stored password using the first account name.

In some embodiments, the method performed by the password management server can further include steps for registering the user device. For example, the method can include receiving a registration request message from the user device. The registration request message includes the public key. The method can further include determining whether the public key included in the registration request message does or does not match at least one of a plurality of registered public keys. The method can further include determining whether to register the public key based on the determining of whether the public key included in the registration request message does or does not match the at least one of the plurality of registered public keys. For example, if the public key does match a previously registered public key, it the password management server may not re-register that public key with another password management account. The method can further include sending a registration response message to the user device. The registration response message including an indication of whether or not the public key is registered. In some embodiments, the registration request message further includes a password management account name. In such embodiments, the method can further include storing the public key and associating the password management account name with the public key.

In some embodiments, the method performed by the password management server can further include steps for storing passwords received from the user device. For example, the method can further include receiving a password storage request from the user device. The password storage request includes the public key, the first password, and a first account name. In this example, the stored password stored during registration is the first password. The method can further include storing the first password in association with the first account name and the public key (e.g., in a password database). The method can further include sending a password storage response message to the user device. The password storage response message include an indication that the first password is stored in association with the first account name and the public key.

In some embodiments, the method performed by the password management server can further include steps for registering a second user device to use the same account registered with the first user device. In such embodiments, the method can further include associating a password management account name with the first public key. The second public key from the second user device can be associated with the same password management account name, as discussed below. The method further includes receiving a second registration request message from the second user device. The second registration request message includes the password management account name and the second public key of the second user device. The method further includes determining that the password management account name included in the second registration request message is associated with the first public key of the first user device.

The method further incudes sending a verification request message to the first user device in response to the determination that the password management account name included in the second registration request message is associated with the first public key of the first user device. The verification request message including an identifier or indicator of the second user device. This way the first user device of the user of the first user device can verify that the second user device is allowed access to the passwords that it stored. The method further includes receiving, by the password management server, a verification response message from the first user device. The verification response message includes an indication that the second user device is authorized to access passwords associated with the password management account name. If the second user device is not authorized, then the password management server may not register the second user device and may not grant the second user device access to the passwords stored by the first user device. The method further includes associating the second public key with the password management account name and each stored password associated with the first public key. The method further includes sending, by the password management server, a second registration response message to the second user device. The second registration response message including a second indication that the second public key is registered. Thus, the second user device and the first user device can share the passwords stored by either device. This is advantageous because the user can easily access their stored passwords across multiple devices that they use.

A computer system may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, embodiments of the invention may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a," "an," or "the" is intended to mean "at least one," unless specifically indicated to the contrary.

What is claimed is:

1. A method for password management, the method comprising:
    sending, by a user device, a request message to a password management server, the request message including a public key of the user device, the public key and a private key forming a public-private key pair;
    receiving, by the user device, a response message from the password management server, the response message including an encrypted password;
    decrypting, by the user device, the encrypted password using the private key to obtain a decrypted password; and
    obtaining, by the user device, access to account information using the decrypted password, and wherein the method further comprises:
    receiving, by the user device, one or more account names associated with the public key from the password management server, the one or more account names including a first account name; and
    sending, by the user device, a password retrieval request to the password management server, the password retrieval request including the first account name.

2. The method of claim 1, further comprising:
    displaying, by the user device, the one or more account names on a user interface of the user device; and
    determining, by the user device, the first account name based on input to the user interface.

3. A method for password management, the method comprising:
    sending, by a user device, a request message to a password management server, the request message including a public key of the user device, the public key and a private key forming a public-private key pair;
    receiving, by the user device, a response message from the password management server, the response message including an encrypted password;
    decrypting, by the user device, the encrypted password using the private key to obtain a decrypted password; and
    obtaining, by the user device, access to account information using the decrypted password, wherein the method further comprises:
    prompting, via a user interface the user device, a user to provide authentication information;
    obtaining, by the user device, the authentication information from the user;
    comparing, by the user device, the authentication information to registered authentication information; and
    validating, by the user device, the authentication information based on the comparing of the authentication information to the registered authentication information.

4. The method of claim 1, further comprising:
    obtaining, by the user device, authentication information of a user of the user device;
    generating, by the user device, the public-private key pair; and
    associating, by the user device, the public-private key pair with the authentication information.

5. The method of claim 1, further comprising:
    sending, by the user device, a registration request message to the password management server, the registration request message including the public key; and
    receiving, by the user device, a registration response from the password management server, the registration response including an indication that the public key is registered to the user device.

6. The method of claim 5, further comprising:
    determining, by the user device, a password management account name based on an input from a user interface of the user device; and
    creating, by the user device, the registration request message based on the input from the user interface, wherein the registration request message further includes the password management account name.

7. The method of claim 1, further comprising:
    obtaining, by the user device, a first password associated with a first account name;
    sending, by the user device, a password storage request to the password management server, the password storage request including the public key, the first password, and the first account name; and
    receiving, by the user device, a password storage response message from the password management server, the password storage response message including an indication that the first password is stored in association with the first account name and the public key.

8. The method of claim 7, further comprising:
    obtaining, by the user device, a second password associated with a second account name;
    sending, by the user device, a second password storage request to the password management server, the second password storage request including the public key, the second password, and the second account name; and receiving, by the user device, two or more account names associated with the public key from the password management server, the two or more account names including the first account name and the second account name.

9. The method of claim 7, further comprising:
establishing, by the user device, a secure communication channel with the password management server, wherein the sending of the password storage request to the password management server uses the secure communication channel.

10. The method of claim 1, further comprising:
sending, by the user device, an account information request message to an authentication server, the account information request message including the decrypted password and an account name, wherein the obtaining of the access to the account information using the decrypted password includes receiving the account information from the authentication server.

11. A method for password management, the method comprising:
receiving, by a password management server, a request message from a user device, the request message including a public key;
determining, by the password management server, a stored password associated with the public key;
encrypting, by the password management server, the stored password using the public key to obtain an encrypted password; and
sending, by the password management server, a response message to the user device, the response message including the encrypted password, and wherein the method further comprises:
determining, by the password management server, one or more account names associated with the public key, the one or more account names including a first account name;
sending, by the password management server, the one or more account names to the user device;
receiving, by the password management server, a password retrieval request from the user device, the password retrieval request including the first account name;
determining, by the password management server, that the first account name is associated with the public key; and
determining, by the password management server, the stored password using the first account name.

12. The method of claim 11, further comprising:
receiving, by the password management server, a registration request message from the user device, the registration request message including the public key;
determining, by the password management server, whether the public key included in the registration request message does or does not match at least one of a plurality of registered public keys;
determining, by the password management server, whether to register the public key based on the determining of whether the public key included in the registration request message does or does not match the at least one of the plurality of registered public keys; and
sending, by the password management server, a registration response message to the user device, the registration response message including an indication of whether or not the public key is registered.

13. The method of claim 12, wherein the registration request message further includes a password management account name, the method further comprising:
storing, by the password management server, the public key; and
associating, by the password management server, the password management account name with the public key.

14. The method of claim 11, wherein the stored password is a first password, the method further comprising:
receiving, by the password management server, a password storage request from the user device, the password storage request including the public key, the first password, and a first account name;
storing, by the password management server, the first password in association with the first account name and the public key; and
sending, by the password management server, a password storage response message to the user device, the password storage response message including an indication that the first password is stored in association with the first account name and the public key.

15. The method of claim 11, wherein the user device is a first user device, wherein the public key is a first public key, the method further comprising:
associating, by the password management server, a password management account name with the first public key;
receiving, by the password management server, a second registration request message from a second user device, the second registration request message including the password management account name and a second public key;
determining, by the password management server, that the password management account name included in the second registration request message is associated with the first public key of the first user device;
sending, by the password management server, a verification request message to the first user device in response to the determination that the password management account name included in the second registration request message is associated with the first public key of the first user device, the verification request message including an identifier or indicator of the second user device;
receiving, by the password management server, a verification response message from the first user device, the verification response message including an indication that the second user device is authorized to access passwords associated with the password management account name;
associating, by the password management server, the second public key with the password management account name and each stored password associated with the first public key; and
sending, by the password management server, a second registration response message to the second user device, the second registration response message including a second indication that the second public key is registered.

16. A user device, comprising:
one or more processor circuits;
a communication interface; and
a computer readable storage medium storing a plurality of instructions that, when executed by the one or more processor circuits, cause the one or more processor circuits to:

send, using the communication interface, a request message to a password management server, the request message including a public key of the user device, the public key and a private key forming a public-private key pair;

receive, using the communication interface, a response message from the password management server, the response message including an encrypted password;

decrypt the encrypted password using the private key to obtain a decrypted password; and obtain access to account information using the decrypted password, and further comprising a user interface, wherein the plurality of instructions further cause the one or more processor circuits to:

receive, using the communication interface, one or more account names associated with the public key from the password management server, the one or more account names including a first account name;

send, using the communication interface, a password retrieval request to the password management server, the password retrieval request including the first account name;

display, using the user interface, the one or more account names on the user interface; and determine the first account name based on input to the user interface.

17. The user device of claim 16, wherein the plurality of instructions further cause the one or more processor circuits to:

obtain authentication information of a user of the user device;

generate the public-private key pair;

associate the public-private key pair with the authentication information;

determine a password management account name based on input from the user interface;

send, using the communication interface, a registration request message to the password management server, the registration request message including the public key and the password management account name; and receive, using the communication interface, a registration response from the password management server, the registration response including an indication that the public key is registered.

18. A password management server comprising:
one or more processor circuits;
a communication interface; and
a computer readable storage medium storing a plurality of instructions that, when executed by the one or more processor circuits, cause the one or more processor circuits to:
receive a request message from a user device, the request message including a public key;
determine a stored password associated with the public key;
encrypt the stored password using the public key to obtain an encrypted password; and
send a response message to the user device, the response message including the encrypted password,
wherein the plurality of instructions further cause the one or more processor circuits to:
determine one or more account names associated with the public key, the one or more account names including a first account name;
send the one or more account names to the user device;

receive a password retrieval request from the user device, the password retrieval request including the first account name;

determine that the first account name is associated with the public key; and determine the stored password using the first account name.

19. The password management server of claim 18, wherein the stored password is a first password, and wherein the plurality of instructions further cause the one or more processor circuits to:

receive a registration request message from the user device, the registration request message including the public key and a password management account name;

determine whether the public key included in the registration request message does or does not match at least one of a plurality of registered public keys;

determine whether to register the public key based on the determining of whether the public key included in the registration request message does or does not match the at least one of the plurality of registered public keys;

store the public key;

associate the password management account name with the public key; and send a registration response message to the user device, the registration response message including an indication of whether or not the public key is registered.

20. The password management server of claim 18, wherein the user device is a first user device, wherein the public key is a first public key, and wherein the plurality of instructions further cause the one or more processor circuits to:

receive a password storage request from the user device, the password storage request including the public key, a first password, and a first account name;

store the first password in association with the first account name and the public key; and send a password storage response message to the user device, the password storage response message including an indication that the first password is stored in association with the first account name and the public key.

21. The password management server of claim 18, wherein the public key is a first public key, wherein the user device is a first user device, and wherein the plurality of instructions further cause the one or more processor circuits to:

associate a password management account name with the first public key;

receive a second registration request message from a second user device, the second registration request message including the password management account name and a second public key;

determine that the password management account name included in the second registration request message is associated with the first public key of the first user device;

send a verification request message to the first user device in response to the determination that the password management account name included in the second registration request message is associated with the first public key of the first user device, the verification request message including an identifier or indicator of the second user device;

receive a verification response message from the first user device, the verification response message including an indication that the second user device is authorized to access passwords associated with the password management account name;

associate the second public key with the password management account name and each stored password associated with the first public key; and send a second registration response message to the second user device, the second registration response message including a second indication that the second public key is registered.

* * * * *